Patented Nov. 9, 1937

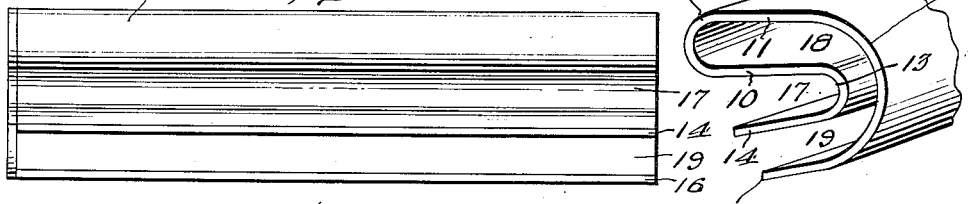

2,098,420

UNITED STATES PATENT OFFICE 2,098,420

HOLDER FOR CABLE RINGS

Francis E. Jackson, deceased, late of Los Angeles, Calif., by Mildred E. Jackson, administratrix, Los Angeles, Calif.

Refiled for abandoned application Serial No. 462,915, June 21, 1930. This application April 5, 1937, Serial No. 135,180

3 Claims. (Cl. 206—46)

This invention relates to improvements in means for holding split rings having hook terminals or the like so as to conveniently support groups of these rings in nested relation.

In outdoor cable construction practice the linemen and other operators find it part of their duties, in the course of aerial cable construction, to place cable rings on suspension. This work calls for the operator being seated in midair upon a trolley and adjacent to him and within easy reach there is, at present, located either a bag or loop of wire in or upon which are promiscuously and loosely placed the cable rings to be hung. The shape of each cable ring is such, however, that one arm is deflected laterally and crookedly out of alignment with the other arm thereof, and formed at the free end of each arm of each cable ring is an integral hook-shaped terminal. As a result of the bunching of cable rings in disorder in the basket, bag or as strung upon the wire loop, the cable rings easily become entangled so that the deflected or crooked portions of some rings interlock with similar parts of adjacent rings, or the hook terminals become connected with varying parts of different cable rings and a large number of rings cannot be instantly separated or extricated from entanglement. Added to this source of difficulty for the operator is the circumstance that he is seated on a suspended seat in mid air and needs to have his hands free for attaching the rings, and in the act of trying to separate entangled rings many are dropped and not recovered, which causes the company hiring the operator pecuniary loss. The loss of time needed for purely ring extricating purposes is material and results in the operator devoting himself to non-essential tasks.

The present invention aims to eliminate the above disadvantages and objections, to provide a means of supporting a group of cable rings in midair that avoids and prevents the cable rings becoming entangled with others, so that the operator can quickly remove one ring at a time when and where needed.

A further object of this invention is to provide a simple, efficient and inexpensive device serving the two-fold purpose of providing a convenient holder for the cable rings as a group whilst same are being shipped, and serving to conveniently suspend groups of these rings in the air so as to be readily accessible to the aerially seated workman.

A still further object of this invention is to provide a sheet metal body so constructed and shaped as to provide a longitudinally extending track having a hook-shaped or U-shaped channel in cross-section and being open at its lower plane so that the hook terminals of the cable rings or of similar members may be introduced endwise into the body and slid along therein into nested relation so that the rings may be suspended from the body in readily and rapidly removable manner.

A still further object of this invention is to provide a body hollowed out to provide an internal elongated chamber open at its lower part and shaped like a hook in cross section enabling the hook terminals of cable rings to be removably seated in said chamber, so that one by one the various cable rings may be slid into position in the body and made to contact, if necessary, the next adjacent ring, so that a group of rings may be suspended along the effective length of the device, and so that any one of these rings may readily be removed or slid out of the body.

With the above and other objects in view this invention consists in the combination, arrangement and details of construction disclosed in the drawing and specification, and then more particularly pointed out in the appended claims.

In the drawing, which is merely illustrative of this invention, and in which similar reference characters designate similar parts throughout the respective views, Figure 1 is a view in rear elevation of the device;

Figure 2 is a fragmental perspective view thereof;

Figure 3 is a side elevation thereof showing the imperforate side;

Figure 4 is a side elevation of the holder showing a group of cable rings arranged and suspended therefrom in nested relation;

Figure 5 is a side elevation of a cable ring showing one of its hooked terminals seated in the holder and suspended therefrom;

Figure 6 is an end elevation, partly in section, showing a clamp for supporting the invention aerially; and Figure 7 is a perspective view of an aerial trolley seat showing the invention with suspended cable rings mounted thereadjacent.

In carrying out the details of this invention there is provided a body of appreciable length and of substantially hook shape or U-shape in cross-section, as shown in Figure 2. This body will be hollowed out internally for the purpose of providing a channel or track for the hook terminals of the usual cable ring, and this body will be closed except at its longitudinal lower area.

It is preferable to take a sheet metal blank and fold one part thereof over another part so as to double one part over the main part. This will provide two parallel or nearly parallel walls which will both be folded together at the same time to give to the holder its ultimate shape and form.

Where the two parts of the sheet metal blank are folded a curved bight portion 12 extends longitudinally of the device as at 12 and connects the flat parallel portions 10 and 11, providing therebetween a rectilinear channel or seat 18. The wall portions 10 and 11 then curve around arcuately as at 13 and 15 in a concentric manner so as to connect this channel 18 with an entrance-passageway for introducing the hook terminals of the cable rings. The wall portion 13 will be returned so as to incline downwardly towards the bight portion 12 terminating in the lip 14. The other curved wall portion 15 curves downwardly and in returned order and formation being spaced apart from portion 14, and is provided with the terminal lip 16 which is disposed with reference to the wall portions 10, 11 at a more obtuse angle than that of portion 14. 19 designates the entrance mouth of throat of the holder. 17 designates the recess between the exterior faces of walls 10 and 14 respectively.

The holder as thus constructed provides a hook-shaped track from end to end of the device, and the end wall 12 closes the holder only at one end, the other end, as shown in Figure 2 being open, and the bottom of the holder is also longitudinally open as will readily be seen. In the grooved out interior of this holder the hook terminal of each cable ring is designed to travel to its allotted place in a group of rings to be suspended upon the track.

The formation and shape of the cable ring proper is that of a split ring of horse-shoe shape and contour as shown in Figure 5.

It will be seen that the opposing curved arms A and B of the cable ring are connected by the bight portion or bend G, and that there is formed at the free end of arm A a hook terminal or bill D and its U-bend C, these parts being disposed at an angle to the arm A. The free end of the arm B of this split ring has its terminal F bent around at a lateral offset from the bend E. From Figure 4 it will be observed that the arm A is deflected laterally from the arm B and that the inner portion I of arm A curves outwardly in one direction while the inner portion of the arm B slopes or curves in an opposite direction to the bend I and again is offset as at H, so that various parts of the cable ring are not in the same general plane.

The hook terminal or bend C of each slit cable ring can be introduced endwise into the holder while the bill D thereof slides upon the flat wall 10 thereof, and the bend C is accommodated in the arcuate space between the walls 13 and 15, the hump P of the shank of the ring clearing the open passage-way 19 of this holder. The proper position of the holder in midair where same is to be drawn from to supply the operator with cable rings is shown in Figure 4 and in Figure 5. In order to secure the holder upon the cable R which also supports the trolley seat 31, by hooks 33 and yokes 32, a clamp consisting of the hanger 20 is used, whose hook 21 engages the wire or cable R aerially; this hanger having a slot 22 in which works the boss 24 of a movable lever 26, the boss being pivoted on a pin 25 passing through an ear 23 on the hanger. The upper end of this lever has the handle 33, and the lower end is properly curved to provide a hooked jaw 27 to engage one side of the holder, and the lower end of hanger 20 is also formed with an integral hook jaw engaging an opposite side of the holder. A contractile spring 31 interposed operatively between hanger and lever normally holds jaws 27, 28 in hooked supporting relation upon the holder, and when the handle 33 is taken hold of and moved inwardly against the tension of spring 31, jaw 27 may be swung out of supporting engagement with the holder and the clamp may thus be released.

It will be understood that the operator seated on the bench 31' will pull the trolley and hanger along as he draws the trolley and line S forwardly to shift his position with respect to cable R. Any ring can be removed by the operator taking hold of same and pulling its hook out of the track of the holder. The way the group of rings are shown nested in Figure 4 they cannot become entangled since similar parts engage similar parts of adjacent rings.

This application is to take the place of an application of Francis E. Jackson, filed June 21, 1930, Serial No. 462,915, which inadvertently became abandoned.

What is claimed as new and desired to secure by Letters Patent of the United States, is:—

1. A holder for hooked end cable rings, comprising an elongated sheet folded longitudinally upon itself to provide two spaced apart walls, and having both walls bent in a hook-shaped formation approximating the configuration of the hooked ends of the cable rings, said holder being open at an end for insertion and removal of the hooked ends of the cable rings.

2. A holder for cable rings of the type having a body of generally U-shaped configuration formed at an end with a cable hook, said holder comprising an elongated double walled body of generally U-shaped configuration in section, provided between the walls with a seat for the ring hooks and having between the free edges of the body a longitudinal slot for projection of the ring bodies, and at an end an opening for reception and withdrawal of said rings.

3. A holder for cable rings of the type having a body of generally U-shaped configuration formed at an end with a cable hook, said holder comprising an elongated double walled body of generally U-shaped configuration in section, provided between the walls with a seat for the ring hooks and having between the free edges of the body a longitudinal slot for projection of the ring bodies, one end of said holder being provided with an opening for reception and withdrawal of said rings, and the other end being closed for retention of the rings within the holder.

MILDRED E. JACKSON,
*Administratrix of the Estate of Francis E. Jackson, Deceased.*